(12) United States Patent
Dermoune et al.

(10) Patent No.: US 8,454,814 B2
(45) Date of Patent: Jun. 4, 2013

(54) PROCESSES AND APPARATUSES FOR TREATING AND/OR INCREASING DRYNESS OF A SUBSTANCE

(75) Inventors: Abderrahmane Dermoune, Sherbrooke (CA); Abdelaziz Bourega, Sherbrooke (CA); Roger Paradis, Mont Saint-Hilaire (CA); Dany Sarrazin-Sullivan, St Denis de Brompton (CA); Jean-Pierre Dionne, Montréal (CA); Mostafa Chamoumi, Sherbrooke (CA)

(73) Assignee: GL&V Canada, Montreal, Quebec (CA)

( * ) Notice: Subject to any disclaimer, the term of this patent is extended or adjusted under 35 U.S.C. 154(b) by 892 days.

(21) Appl. No.: 12/304,472

(22) PCT Filed: Jun. 13, 2007

(86) PCT No.: PCT/CA2007/001052
§ 371 (c)(1),
(2), (4) Date: Jul. 20, 2009

(87) PCT Pub. No.: WO2007/143840
PCT Pub. Date: Dec. 21, 2007

(65) Prior Publication Data
US 2010/0163428 A1 Jul. 1, 2010

Related U.S. Application Data

(60) Provisional application No. 60/804,713, filed on Jun. 14, 2006.

(51) Int. Cl.
*C02F 11/12* (2006.01)

(52) U.S. Cl.
CPC .................................... *C02F 11/12* (2013.01)
USPC .......................................... 204/649; 204/553

(58) Field of Classification Search
USPC ....................... 204/553, 648–650; 210/748.01
See application file for complete search history.

(56) References Cited

U.S. PATENT DOCUMENTS 4,001,100 A * 1/1977 Haydock ....................... 204/553
4,135,307 A   1/1979 Candor
4,671,874 A * 6/1987 Fremont et al. ............... 204/627
(Continued)

FOREIGN PATENT DOCUMENTS

CA      2199389      10/1994
CA      2408971      11/2001
(Continued)

OTHER PUBLICATIONS

Gingerich et al, Electroosmotically Enhanced Sludge Pressure Filtration, Water Environment Research, vol. 71, No. 3, pp. 267-276 (May/Jun. 1999).*

(Continued)

*Primary Examiner* — Keith Hendricks
*Assistant Examiner* — Salil Jain
(74) *Attorney, Agent, or Firm* — Anglehart et al.

(57) ABSTRACT

There are provided apparatuses for increasing dryness of a substance. The apparatuses comprise at least one module, each of the module(s) comprising at least two electrodes adapted to submit the substance to an electric current. The electrodes are also adapted to compress the substance. There are also provided processes for increasing dryness of a substance.

22 Claims, 12 Drawing Sheets

U.S. PATENT DOCUMENTS

| | | | |
|---|---|---|---|
| 5,092,974 A * | 3/1992 | Kondo et al. | 204/518 |
| 5,225,209 A * | 7/1993 | Hayashi | 425/145 |
| 5,279,718 A | 1/1994 | Kondo | |
| 5,401,375 A | 3/1995 | Yamaguchi et al. | |
| 5,656,165 A * | 8/1997 | Yamamoto et al. | 210/400 |
| 5,827,432 A * | 10/1998 | Huhtamaki et al. | 210/705 |
| 6,478,934 B2 * | 11/2002 | Oldani et al. | 204/219 |
| 6,871,744 B2 * | 3/2005 | Miller et al. | 210/350 |
| 7,578,918 B2 * | 8/2009 | Berrak et al. | 204/553 |
| 7,935,236 B2 * | 5/2011 | Marshall et al. | 204/515 |
| 2007/0051682 A1 * | 3/2007 | Jones et al. | 210/650 |
| 2010/0129559 A1 * | 5/2010 | Dermoune et al. | 427/424 |
| 2012/0055797 A1 * | 3/2012 | Dermoune et al. | 204/553 |

FOREIGN PATENT DOCUMENTS

| | | |
|---|---|---|
| JP | H4-13003 | 1/1986 |
| JP | S63-69518 | 3/1988 |
| JP | H7-73646 | 1/1989 |
| JP | H6-15706 | 3/1994 |
| JP | H6-218397 | 9/1994 |
| WO | 9711767 | 4/1997 |

OTHER PUBLICATIONS

IDS filed at the Japan Patent Office in Application No. 2009-514603 (Dated Jul. 26, 2011).

* cited by examiner

PROCESSES AND APPARATUSES FOR TREATING AND/OR INCREASING DRYNESS OF A SUBSTANCE

TECHNICAL FIELD

The present invention relates to the field of electro-dewatering processes and apparatuses for increasing dryness of a substance and processes and apparatuses for treating a substance, for example by decontaminating such a substance. Such a decontamination can be, for example, microorganisms deactivation and/or destruction. Such a substance can be a liquid bearing material, for example a material containing water or other liquids such as organic solvents.

BACKGROUND OF THE INVENTION

Electro-dewatering relates to the treatment of a substance in order to increase its dryness. Such a process is based on the combined action of electro-osmosis and pressure. The phenomenon of electro-osmosis is based on the fact that electric potential, applied to electrodes in a porous medium, activates the movement of cations from the positive pole (anode) to the negative pole (cathode), thereby dragging with it water molecules by viscous action. This allows a solid/liquid separation and, consequently, porous material (such as sludge or soil) dewatering.

One of the main drawbacks of the electro-osmosis techniques is the drop of potential that occurs at the anode. A drop of potential at the anode can be explained by the decrease of water content of the porous material adjacent to the anode. It can also be explained by the decrease of the conductivity of the pore water, the gap caused by the generated gases during the electrolysis and by the dissolution of the material constituting the anode. Moreover, a drop of potential can also be explained because of an inappropriate contact between the anode and the porous material. Thus, the voltage gradient which is directly applied to the porous material can only be a fraction of the voltage applied to the electrodes.

It would thus be desirable to overcome at least one of such drawbacks or to provide an efficient alternative to the existing solutions.

SUMMARY OF THE INVENTION

According to one aspect of the invention, there is provided an apparatus for increasing dryness of a substance, the apparatus comprising at least one module, each of the module(s) comprising at least two electrodes adapted to submit the substance to an electric current, one of the electrodes being a flexible electrode adapted to be in movement according to a predetermined direction and to impart the movement to the substance; and another of the electrodes being comprised within at least one independent electrode-unit, when more than one electrode-unit being present, the electrode-units being isolated from one another, the other electrode being adapted to move in a direction which is substantially perpendicular to the predetermined direction and to compress the substance.

According to another aspect of the invention, there is provided an apparatus for increasing dryness of a substance, the apparatus comprising at least one module, each of the module(s) comprising at least two electrodes adapted to submit the substance to an electric current, one of the electrodes being an immovable electrode which is in close proximity with means for imparting a movement in a predetermined direction to the substance; and another of the electrodes being comprised within at least one independent electrode-unit, when more than one electrode-unit being present, the electrode-units being isolated from one another, the other electrode being adapted to move in a direction which is substantially perpendicular to the predetermined direction and to compress the substance.

According to another aspect of the invention, there is provided an apparatus for increasing dryness of a substance, the apparatus comprising at least one module, each of the module(s) comprising at least two electrodes adapted to submit the substance to an electric current, at least one of the electrodes being comprised within at least one independent electrode-unit, when more than one electrode-unit being present, the electrode-units being isolated from one another, at least one of the electrodes is adapted to compress the substance, and at least one of the electrodes comprises vacuum means for facilitating liquid removal.

According to another aspect of the invention, there is provided an apparatus for increasing dryness of a substance, the apparatus comprising at least one module, each of the module(s) comprising at least two electrodes adapted to submit the substance to an electric current, at least one of the electrodes being comprised within at least one independent electrode-unit, when more than one electrode-unit being present, the electrode-units being isolated from one another, at least one of the electrodes is adapted to compress the substance, and at least one of the electrodes is adapted to provide an electrolyte to the substance and/or reducing and/or preventing voltage loss at the electrode.

According to another aspect of the present invention there is provided an electrode-unit for use in an apparatus for increasing dryness of a substance, the electrode-unit comprising:

a support member adapted to be releasably inserted into the apparatus;
at least one electrode; and
means for moving the at least one electrode in a predetermined direction and applying pressure on the substance, the means being connected to the support member and to the at least one electrode.

According to another aspect of the present invention there is provided in an apparatus for increasing dryness of a substance comprising at least two electrodes, means for applying pressure on the substance and means for conveying the substance in a predetermined direction from an inlet to an outlet, the improvement wherein the means for applying pressure on the substance is adapted to move at least one of the electrodes to apply a pressure on the substance, and wherein the pressure is applied substantially perpendicularly to the predetermined direction.

The apparatuses of the present invention can comprise a vacuum system disposed adjacently to one of the electrodes. The apparatuses of the present invention can also be adapted to provide an electrolyte to the substance to be treated. The apparatuses can also have one flexible electrode adapted to be in movement according to a predetermined direction and to impart the movement to the substance; and another electrode being comprised within at least one independent electrode-unit when more than one electrode-unit being present, the electrode-units being isolated from one another, the other electrode being adapted to move in a direction which is substantially perpendicular to the predetermined direction and to compress the substance. Alternatively, the apparatuses can also have one immovable electrode which is in close proximity with means for imparting a movement in a predetermined direction to the substance; and another electrode being comprised within at least one independent electrode-unit when more than one electrode-unit being present, the electrode-units being isolated from one another, the other electrode being adapted to move in a direction which is substantially perpendicular to the predetermined direction and to compress the substance. The apparatuses can further comprise means for reducing and/or preventing voltage loss at one of the electrodes. Such means can be, for example, means for dispensing an electrolyte at the electrode-substance interface, or means for breaking a crust made during the treatment. The electrode-unit(s) can be anode-unit(s).

In the apparatuses of the present invention at least one of the electrodes can comprise vacuum means for facilitating liquid removal. At least one of the electrodes can be adapted to provide an electrolyte to the substance and/or reducing and/or preventing voltage loss at the electrode. The apparatuses can comprise at least two modules, the modules being disposed in a parallel manner so as to treat the substance. They can also be disposed in series. The apparatuses can comprise at least one module, and wherein the electrodes adapted to compress the substance are anodes which are disposed into an anode-panel so as to extend into rows transversally and into lines longitudinally. Each of the electrodes adapted to compress the substance can be an anode and is disposed into an anode-unit, and wherein each of the modules comprises at least one anode-unit. The anode-unit can comprise a mobile lower portion and an upper portion which is adapted to be immovable with respect to the apparatus, when the lower portion is in movement. The upper portion can comprise means which allows fixation on a supporting structure, and the lower portion comprises the anode. The anode-unit comprises means for moving the anode (such as pressure means). The means for moving the anode can comprise at least one pneumatic actuator, at least one mechanical system (such as cam system, hydraulic system, screw system or the like), at least one piston or at least one electrical system. The means for moving the anode can be connected at one end to the upper portion, and at another end to the lower portion. The means for moving the anode can comprise at least one pneumatic actuator connected at one end to the upper portion, and at another end to the lower portion. The lower portion can comprise an electrical insulating and/or rigidifying plate which is disposed between the pneumatic actuator and the anode. Such an insulating plate can permit electrical insulation. A single plate can perform both functions or alternatively two different plates can be used. Other known means can also be used so as to rigidify the anode for example a grid made of a metal or an isolating material. The lower portion and the upper portion can be connected together via means (such a spring) adapted to urge the lower portion into a raised position. Other means can be used to raise the mobile lower portion of the anode-units. For example, a double action jacks or an electrical motor with a screw can be used. The means for applying pressure can be provided to each anode-unit or to each anode-units row. Such means can be positioned inside or outside each anode-unit or anode-units row. The mobile lower portion of at least one anode-unit can be raised during the treatment so as to allow gas evacuation In the apparatuses of the present invention, the apparatuses can comprise at least one module. The electrodes which are adapted to compress the substance can be anodes which are disposed into an anode-panel so as to extend into rows transversally and into lines longitudinally. Each row can comprise at least one anode-unit. The at least one anode-unit can comprise means for moving the anode (such as means for applying pressure on the substance). The means for moving the anode can be disposed outside the row and adjacent thereto.

The anode-units can comprise a power supply fixed to the upper portion and connected to the anode. A DC, AC or pulsed current can be used. A control system can also be provided for preventing electrical short circuit. The power supplies can be disposed on the anode-panel or adjacent to the module. The voltage, electrical current, and pressure can independently be controlled for each anode-unit. The anode can be adapted to maintain a substantially constant contact with the substance during a treatment of the substance. The anode(s) can be adapted to be disposed at various distances from the cathode(s). The anodes can be disposed at a different distance from the cathode(s). The apparatuses can also comprise a feeding system adapted to allow a uniform spreading or distribution of the substance at a defined thickness for example substantially on the entire width of at least one of the electrodes. The apparatuses can also comprise at least two modules disposed in series, the apparatus comprising, between each adjacent modules, a transfer system, which comprises a shredding system, the transfer system permitting to transfer shredded and treated substance from a module to another one. Such a shredding system can be disposed so as to act substantially in the middle and/or at the end of a treatment.

In the apparatuses of the present invention, the substance can be conveyed substantially in an horizontal direction. The pressure can be applied substantially perpendicularly to the said direction. The substance can be compressed by maintaining a contact substantially constant between the other electrode and the substance when the substance is submitted to the electric current. The pressure applied to the substance can vary according to the substance consistency. For example, the pressure can be increasing when the substance consistency is increasing. The pressure applied to the substance can be substantially non-existent at the beginning of the treatment, and then, the pressure is progressively increased. According to another example, the pressure applied to the substance can be constant. The anode can be a perforated anode. The apparatus can further comprise a filter mounted on the anode and adapted to be disposed between the anode and a substance to be treated with the apparatus. The cathode(s) can comprise a plurality of rollers made of a conductive metal.

In the electrode-unit the support member can be adapted to be immovable with respect to the apparatus when the electrode is in movement. The means for applying pressure on the substance can comprise at least one pneumatic actuator, at least one mechanical system (such as cam system, hydraulic system, screw system or the like), at least one piston or at least one electrical system. An insulating and/or rigidifying member can be disposed between the at least one electrode and the means for applying pressure. The electrode-unit can further comprise means (such as a spring) for urging the at least one electrode in a non-compressing position or raised position. The electrode-unit can further comprise a power supply connected to the at least one electrode. It can also comprise a control system for preventing electrical short circuit. The support member can be included in an upper portion of the electrode-unit. At least one electrode can be included in a lower portion of the electrode-unit. The substance can be compressed by maintaining a contact substantially constant between the at least one electrode and the substance when the substance is submitted to the electric current. The pressure applied to the substance can vary according to the substance consistency. The pressure can be increasing when the substance consistency is increasing. The pressure applied to the substance can be substantially non-existent at the beginning of the treatment, and then, the pressure is progressively increased. Alternatively, the pressure applied to the substance can be constant.

According to another aspect of the present invention there is provided a process for increasing dryness of a substance, the process comprising submitting the substance to an electrical current, applying a pressure on the substance so as to compress it, and moving the sludge in a predetermined direction, the process being characterized in that the pressure applied to the substance is applied substantially perpendicularly with respect to the predetermined direction. The person skilled in the art would recognize that such process can be carried out, when applicable, by means of any one of the apparatuses described in the present document and their various embodiments. The electrical current can be submitted to the substance by means of at least two electrodes including at least one movable electrode. The pressure can be applied on the substance by at least one movable electrode. The at least one movable electrode can be at least one anode. For example, the predetermined direction can be a substantially horizontal direction. The pressure can be applied by downwardly moving the at least one anode so as to compress the substance.

The pressure can be applied to the substance by a plurality of anodes, each of the anodes being independent from one another. For example, each of the anodes can apply a different pressure on the substance. According to another example, all the anodes can apply substantially the same pressure on the substance. Moreover, each of the anodes can apply a different current intensity and/or different voltage on the substance. Alternatively, all the anodes can apply substantially a current of same intensity and/or same voltage on the substance. The process can be carried out by maintaining a substantially constant contact between the electrodes and the substance. The process can also be carried out by maintaining a substantially constant contact between the at least one anode and the substance. For example, the process can be carried out by maintaining a substantially constant contact between the substance and at least one of the anodes.

The pressure applied to the substance can vary in accordance to the substance consistency. For example, the pressure can be increasing when the substance consistency is increasing. According to another example, the pressure applied to the substance can be substantially non-existent at the beginning of the process, and then, the pressure can be progressively increased. Alternatively, the pressure applied to the substance can be constant. The process of the present invention can be very useful since it can further permits decontamination of the substance. For example, it can permit microorganisms deactivation and/or destruction. Moreover, during the treatment, at least one effluent can be generated and the process can permit deactivation and/or destruction of microorganisms optionally contained in the at least one effluent. The substance to be treated and dewatered can be sludge. For example, the sludge can have a dryness of about 10 to about 25%. During the treatment, (about in the middle) and/or at the end, the substance can be shredded. The process can carried out by at least two modules. Each module can comprise at least two electrodes, the substance being shredded between treatment of two modules. The substance to be treated and dewatered can be spread uniformly, on the form of a cake of a given thickness, substantially on to the entire width of a conveyor. The substance can be moved by means of the conveyor. The substance can be substantially uniformly deposited on the conveyor according to a predetermined thickness, the thickness varying in accordance with the substance to be treated and the type of treatment applied to the substance. The compression and uniform deposition of the substance can permit to carry out a uniform electro-dewatering treatment on the substance. The compression and uniform deposition of the substance can permit to increase the conductibility of the substance to be treated. A mobile lower portion of at least one anode-unit can be raised during the treatment so as to allow gas evacuation.

According to another aspect of the invention, there is provided a feeding system for use in an apparatus for increasing dryness of a substance, the system comprising:
  a housing comprising an inlet and an outlet; and
  at least two rotating means disposed in the housing and adjacently to the outlet, the rotating means being adapted to compress and move the substance substantially vertically towards the outlet, one of the rotating means being closer to the outlet than at least one other of the rotating means, the rotating means which is closer to the outlet is adapted to move essentially vertically so as to control the thickness of the substance to be dispensed through the outlet.

The rotating means closer to the outlet can be restricted to move along a vertical axis. The rotating means can be substantially horizontally extending and can be rotated around a substantially horizontal rotation axis. The rotation axis of the rotating means which is closer to the outlet (than another of the rotating means) is lower than the rotation axis of the other rotating means. The rotating means can be adapted to receive therebetween the substance to be dispensed. The rotating speed of at least one rotating means can be adjusted. The rotating speed can be varied in accordance with the nature of the substance to be treated. For example, the rotating means can be rollers. For example, at least two rollers can be disposed adjacently to the outlet and can be rotated at a same speed. The apparatus can further comprise two upper rollers disposed between the inlet and the rollers disposed adjacently to the outlet. The upper rollers can be substantially horizontally extending and can be rotated around a substantially horizontal rotation axis. The upper rollers can be rotated substantially at a same speed and can be adapted to receive therebetween the substance to be dispensed. The apparatus can further comprise adjustment means. The adjustment means can permit to adjust the horizontal distance between the rollers disposed adjacently to the outlet. The adjustment means can also permit to adjust the horizontal distance between the upper rollers. The horizontal distance between the upper rollers can be greater than the horizontal distance between the rollers disposed adjacently to the outlet. The outlet and the rotating means can be adapted to allow a substantially uniform deposition of the substance on a substrate to be disposed below the outlet. The rotating means can comprise means for evacuating a liquid contained within the substance. Such means for evacuating a liquid can comprise apertures defined within the rotating means. The apertures are adapted for evacuating the liquid.

According to another aspect of the invention, there is provided a feeding system for use in combination with a conveyor, the system comprising:
  a housing adapted to receive a substance to be spread on the conveyor via the feeding system, the housing comprising an inlet and an outlet, the outlet being adapted to be disposed adjacently to the conveyor; and
  at least two rotating means disposed adjacently to the outlet, the rotating means being adapted to compress and to move the substance downwardly to the outlet, the rotating means being each disposed at a different vertical distance from the outlet, the rotating means which is the closest to the outlet is adapted to move essentially vertically so as to control the thickness of the substance to be spread on the conveyor through the outlet. The rotating means can comprise means for evacuating a liquid contained within the substance. Such means for evacuating a liquid can comprise apertures defined within the rotating means. The apertures are adapted for evacuating the liquid.

The outlet and the rotating means closest to the outlet are adapted to allow a substantially uniform deposition of the substance on the conveyor. The rotating means which is the closest to the outlet is restricted to move along a vertical axis. The rotating means can be substantially horizontally extending and can be rotated around a substantially horizontal rotation axis. The rotating means can be adapted to receive therebetween the substance to be spread on the conveyor. The rotating means can be rollers. For example, at least two rollers can be disposed adjacently to the outlet and can be rotated at a same speed. The apparatus can further comprise two upper rollers disposed between the inlet and the rollers disposed adjacently to the outlet. The upper rollers can be substantially horizontally extending and can be rotated around a substantially horizontal rotation axis. The upper rollers can be rotated substantially at a same speed and can be adapted to receive therebetween the substance to be spread on the conveyor. The feeding system can further comprise adjustment means. Such adjustment means can permit to adjust the horizontal distance between the rollers disposed adjacently to the outlet. The adjustment means can also permit to adjust the horizontal distance between the upper rollers. For example, the horizontal distance between the upper rollers can be greater than the horizontal distance between the rollers disposed adjacently to the outlet. The rotating means which is the closest to the outlet can be the rotating means which is the closest to an outlet of the conveyor. Alternatively, the rotating means which is the closest to the outlet can be the rotating means which is the farthest from an outlet of the conveyor. The rotating speed of at least one rotating means can be adjusted. The rotating speed can be varied in accordance with the nature of the substance to be treated. The rotating means can comprise means for evacuating a liquid contained within the substance. Such means for evacuating a liquid can comprise apertures defined within the rotating means. The apertures are adapted for evacuating the liquid.

According to another aspect of the invention, there is provided a feeding system for spreading a substance, the system comprising:
 a housing adapted to receive the substance and comprising an inlet and an outlet; and
 at least two rotating means disposed in the housing and adjacently to the outlet, the rotating means being adapted to compress and move the substance to the outlet, one of the rotating means being closer to the outlet than at least one other of the rotating means, the rotating means which is closer to the outlet is adapted to move essentially along an axis so as to control the thickness of the substance to be spread through the outlet.

The rotating means closer to the outlet can be restricted to move along the axis. The rotating means can be adapted to receive therebetween the substance to be fed to the conveyor. The rotating speed of at least one rotating means can be adjusted. The rotating speed can be varied in accordance with the nature of the substance to be treated. For example, the rotating means can be rollers. The at least two rollers disposed adjacently to the outlet can be rotated at a same speed. The apparatus can further comprise at least two other rollers disposed between the inlet and the rollers disposed adjacently to the outlet. The at least two other rollers can be rotated substantially at a same speed and can be adapted to receive therebetween the substance to be spread through the outlet. The feeding system can further comprise adjustment means. The adjustment means can permit to adjust the distance between two adjacent rollers disposed so as to control the pressure applied to the substance passing therebetween. The distance between the at least two other rollers is greater than the distance between the rollers disposed adjacently to the outlet. The outlet and the rotating means can be adapted to allow a substantially uniform deposition of the substance on a substrate to be disposed below the outlet. The rotating means can comprise means for evacuating a liquid contained within the substance. Such means for evacuating a liquid can comprise apertures defined within the rotating means. The apertures are adapted for evacuating the liquid.

It was found that such feeding systems can offer several advantages. In fact, when such a feeding system is combined with an electro-dewatering apparatus, the feeding system can allow for an appropriate compaction and a uniform spreading or distribution of the substance substantially on the entire width of a substrate (for example a conveyor) used by the apparatus for holding the substance to be treated. When such an appropriate compaction is carried out, the substance to be treated can withstand a greater pressure. Moreover, in such a case, the substance to be treated allows for a better current conductibility since becoming less insulating for example by reducing the amount of air in it. For example, when using such a feeding system, spreading of the substance is carried out uniformly and a cake of the substance to be treated having a uniform thickness over substantially the whole surface (width) of the substrate or conveyor can be obtained. Such a cake thus allows to carry out a uniform electro-dewatering process on the substance. Such systems are also effective for feeding with a substance to be treated, any apparatus, in a continuous manner.

According to another aspect of the present invention, there is provided a method for spreading a substance on a substrate. The method comprises:
 introducing the substance between cooperating rollers so as to compress the substance and move substantially downwardly the substance towards the substrate,
the method being characterized in that before introducing the substance between the rollers, one of the rollers is moved essentially along a vertical axis so as to select a position at which its vertical distance to the substrate is smaller than the vertical distance of the other rollers to the substrate, and at which the substance to be spread will have a predetermined thickness.

BRIEF DESCRIPTION OF DRAWINGS

Further features and advantages of the invention will become more readily apparent from the following examples shown in the drawings wherein.

DETAILED DESCRIPTION OF THE INVENTION

Further features and advantages of the invention will become more readily apparent from the following non-limiting specific embodiments.

Figure 1:
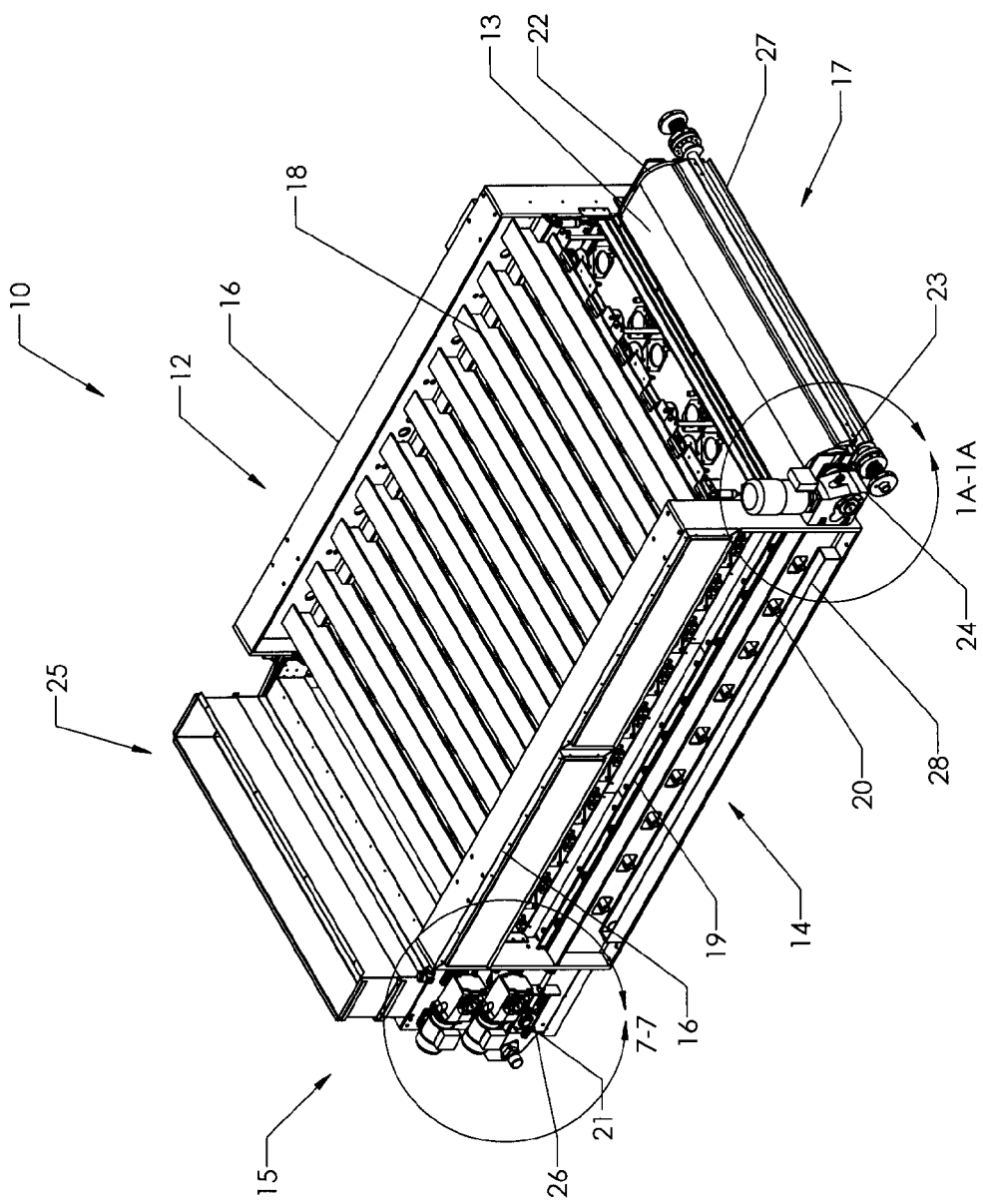
FIG. 1 is a side perspective view of an apparatus for the treatment and dewatering of a liquid bearing material according to a specific example of the present invention.

FIG. 1 represents an apparatus for treatment and dewatering of a liquid bearing material or increasing dryness of a substance. The apparatus 10 comprises an inlet 15 and an outlet 17, both are respectively adapted to receive the substance to be treated and dewatered and to evacuate. This apparatus comprises a single module. The apparatus 10 comprises an upper panel 12 named anode-panel and a lower panel 14 named cathode-panel. The anode-panel 12 comprises two longitudinal main beams 16 positioned on the laterals sides and secondary beams 18 laying between the beams 16. The cathode-panel 14 comprises two longitudinal main beams 20 positioned on the lateral sides, and a cathode 19. The apparatus also comprises means for imparting a movement in a predetermined direction to the substance. Such means can be a conveyor 13, for example a fabric conveyor disposed on top of the cathode 19 and adapted to convey the substance to be treated from the inlet 15 to the outlet 17. The conveyor can be, for example, filtering membrane. Alternatively, the cathode itself can be used as conveyor i.e. simultaneously used as conveyor and electrode (mobile electrode). The apparatus 10 also comprises rollers 21 and 22, which are fixed respectively by means of an adjustable flange bearing 26 and a flange bearing 23. The rollers 21 and 22 allow for guidance and movement of the fabric conveyor 13 which permits transport of the substance to be treated and dewatered. A drive motor 24 allows the movement of the conveyor 13. At the inlet 15 a feeding system 25 feeds the apparatus 10 with the substance to be treated and dewatered in order to increase its dryness. Alternatively, other systems can be used instead of the feeding system for example a belt press system or any system that can permit to control the thickness of the substance. An effluent collecting conduit 28 allows the evacuation of the effluent resulting from the treated and dewatered substance. At the outlet 17 a scraper 27 allows to remove the treated and dewatered substance sticking on the fabric conveyor 13.

Figure 1A:
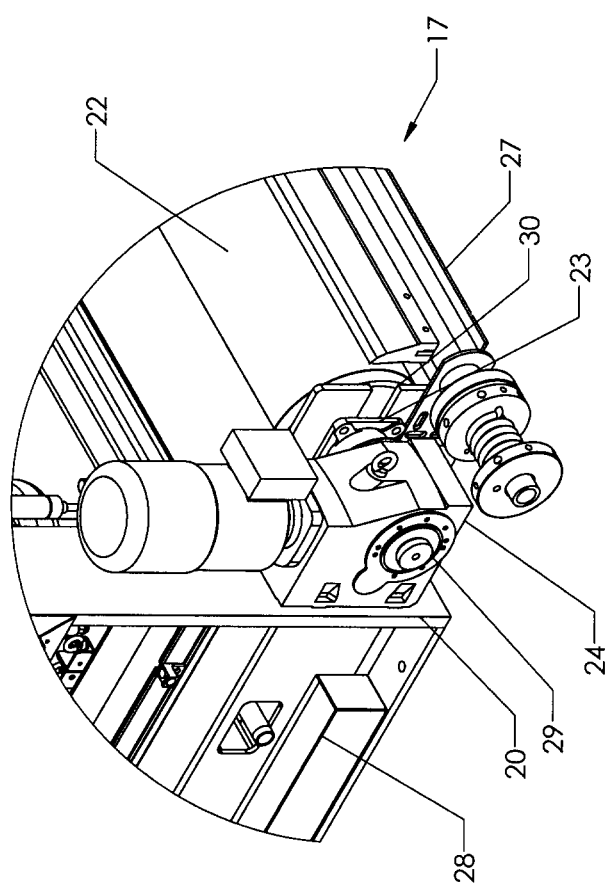
FIG. 1A is an enlarged view of an outlet of the apparatus shown in FIG. 1.

FIG. 1A presents details of the outlet 17 and shows a scraper 27, and a drive motor 24 which allows the movement of the conveyor 13. Stainless steel rollers 22 allow guidance and movement of the conveyor 13. The flange bearing 23 supports a shaft 29. The roller 22, the scraper 27, and the drive motor 24 are fixed to a fixation system 30. The fixation system 30 is fixed to the longitudinal main beam 20.

Figure 2:
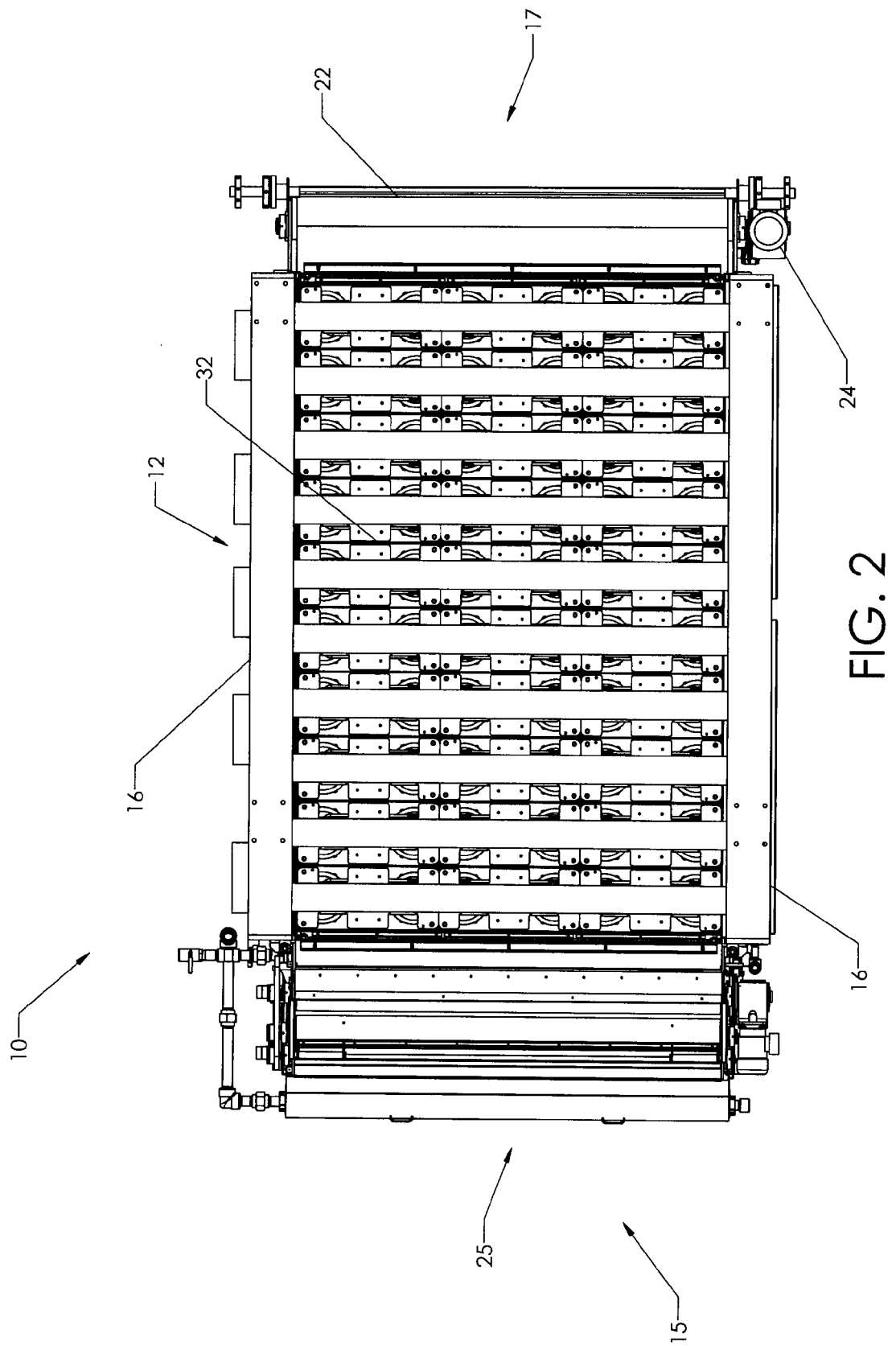
FIG. 2 is a top view of the apparatus shown in FIG. 1.

As shown in FIG. 2, the apparatus 10 comprises the anode-panel 12, the longitudinal beams 16, the anode-units 32 laid transversally and longitudinally, the feeding system 25, the inlet 15, the outlet 17, the cylinders 22 and the drive motor 24.

Figure 3:
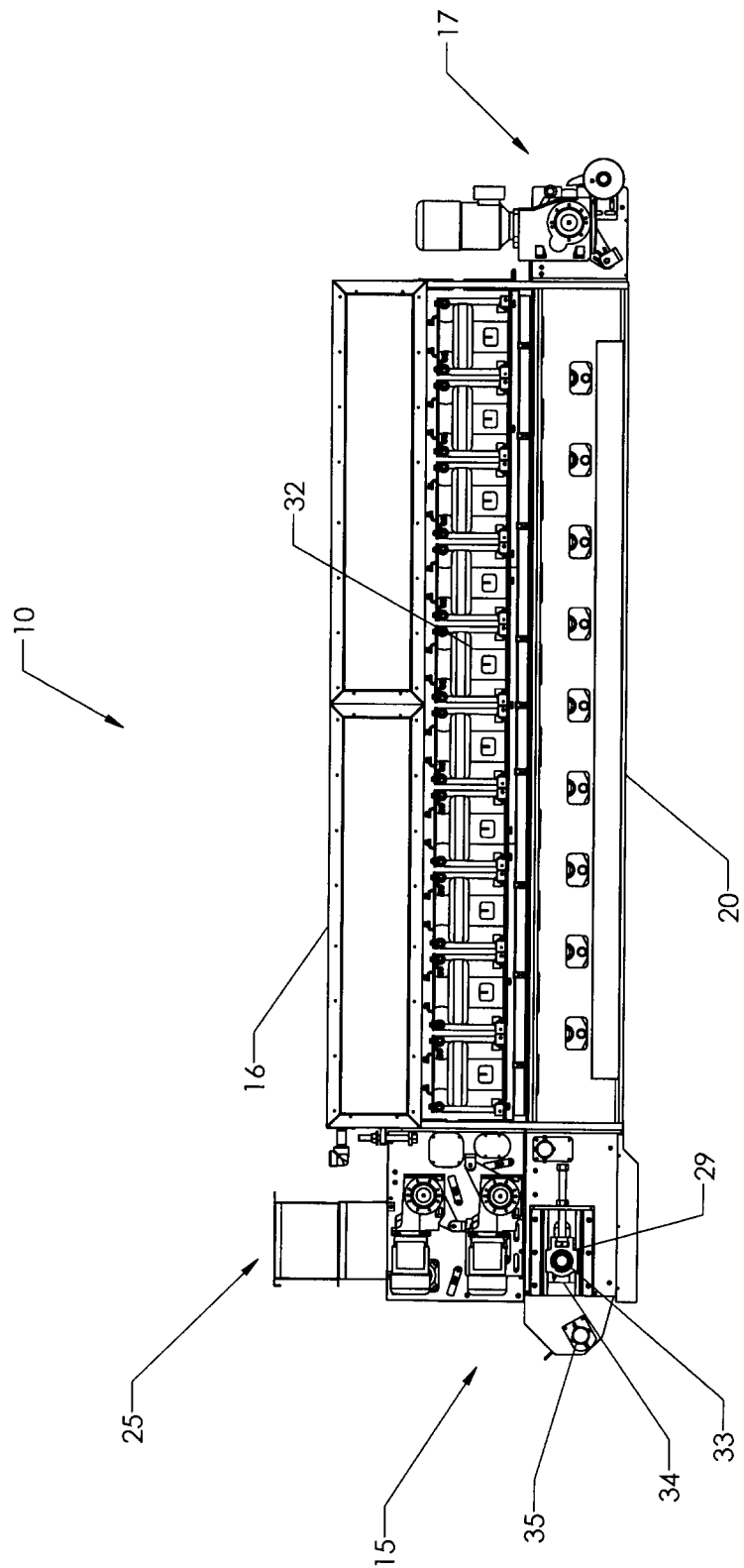
FIG. 3 is a side elevation view of the apparatus shown in FIG. 1 in which the anode-units are shown.

As shown in FIG. 3 the apparatus 10 includes the inlet 15, the outlet 17, arrangement of the longitudinal beams 16 and 20, the anode-units 32 laid longitudinally, a spray bar 35, a flange bearing 33 which allows fixation and adjustment of a roller 34. The roller 34 permits to guide and stretch the conveyor (not shown).

Figure 4:
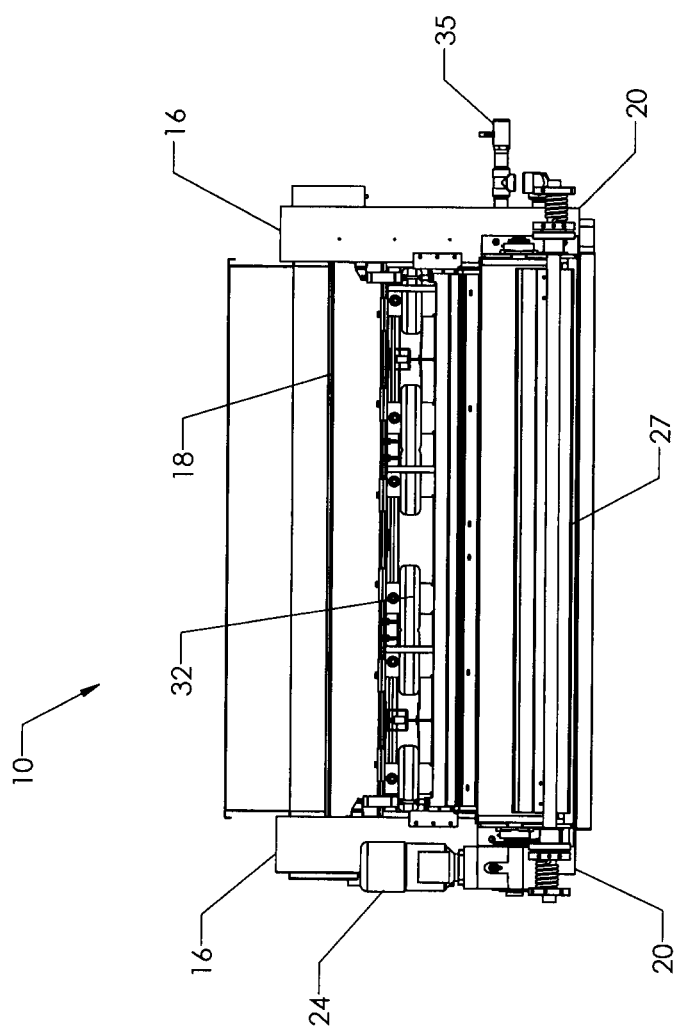
FIG. 4 is a rear elevation view of the apparatus shown in FIG. 1, wherein showing the outlet of the apparatus.

FIG. 4 shows the anode-units 32 layout in the transversal axe of the apparatus 10, the beams 16 and 20, the drive motor 24, the spray bar 35 and the arrangement of the scraper 27. The secondary beams 18 support the anode-units 32.

Figure 5:
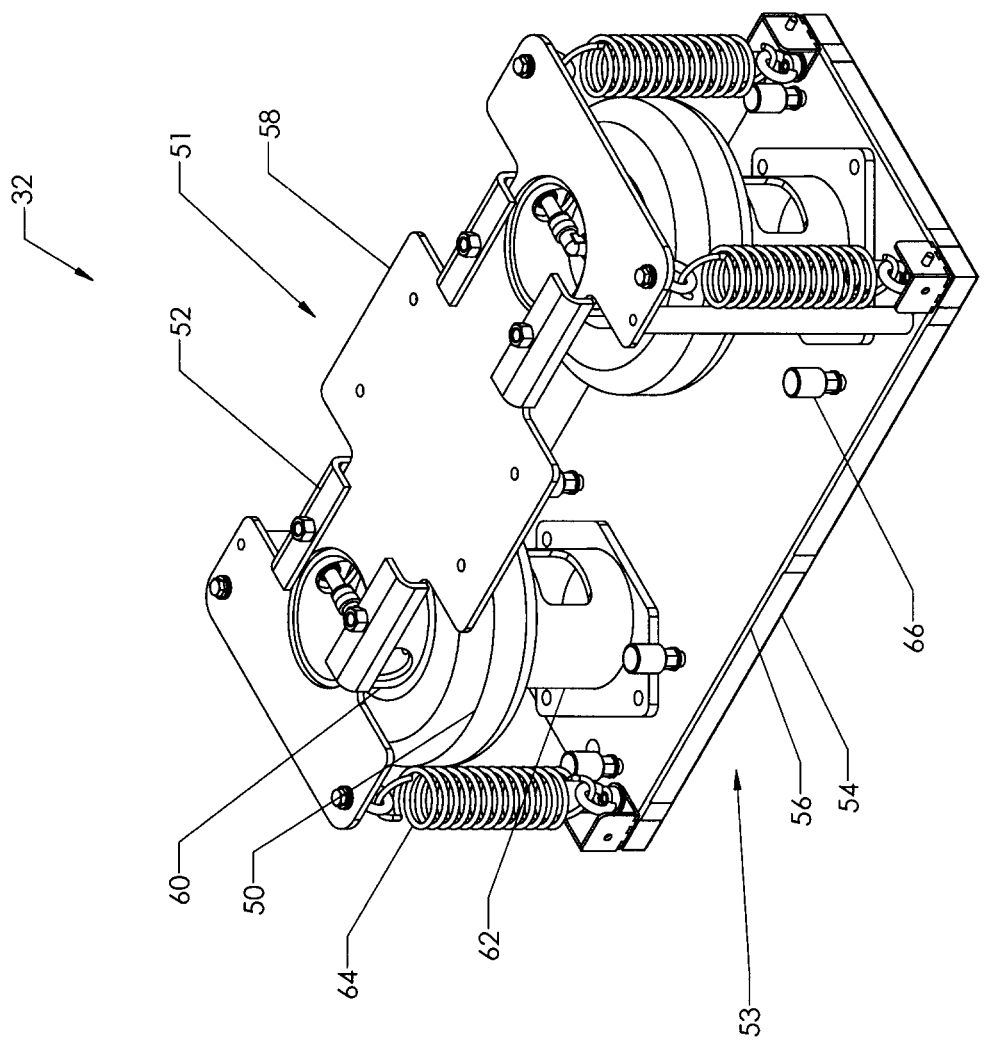
FIG. 5 is a front elevation view of an anode-unit for use in an apparatus as shown in FIG. 1.

FIG. 5 shows an enlarged view of the anode-unit 32 and shows the layout of its two pneumatic actuators 50, and an anode 53. The anode 53 comprises an insulating plate 56 and a metal plate 54. The anode-unit 32 is adapted to be releasably inserted into the apparatus 10 so that a user can modify the amount of anode-units 32 used in the apparatus. The support member 51 comprises guiding brackets 52 and a metal plate 58. The metal plate 58 is adapted to be fixed on a supporting metal structure of the apparatus 10 by means of the guiding brackets 52. The metal plate 58 permits attachment of the pneumatic actuators 50 through guiding cylinders 60 to the upper portion of the anode-unit 32. The pneumatic actuators 50 permit attachment of the insulating plate 56 through guiding cylinders 62. Springs 64 are attached to the metal plate 58 and to the insulating plate 56. The springs 64 permit to urge the anode 53 into a raised position or a position whereat the substance to be treated is not compressed. Electrical connectors 66 are fixed on the insulating plate 56 and allow electrical connection of the anode 53.

Figure 6:
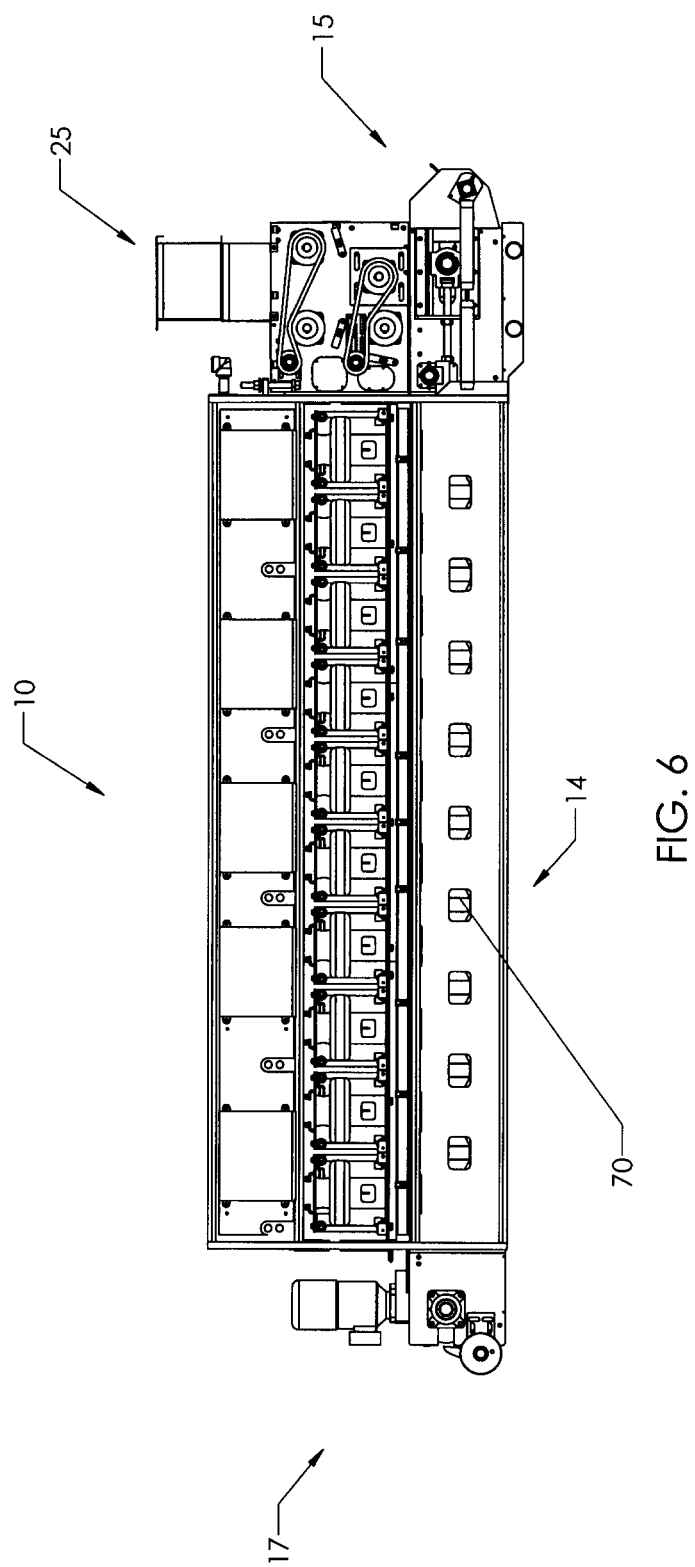
FIG. 6 is another side perspective view of the apparatus shown in FIG. 1.
Figure 6A:
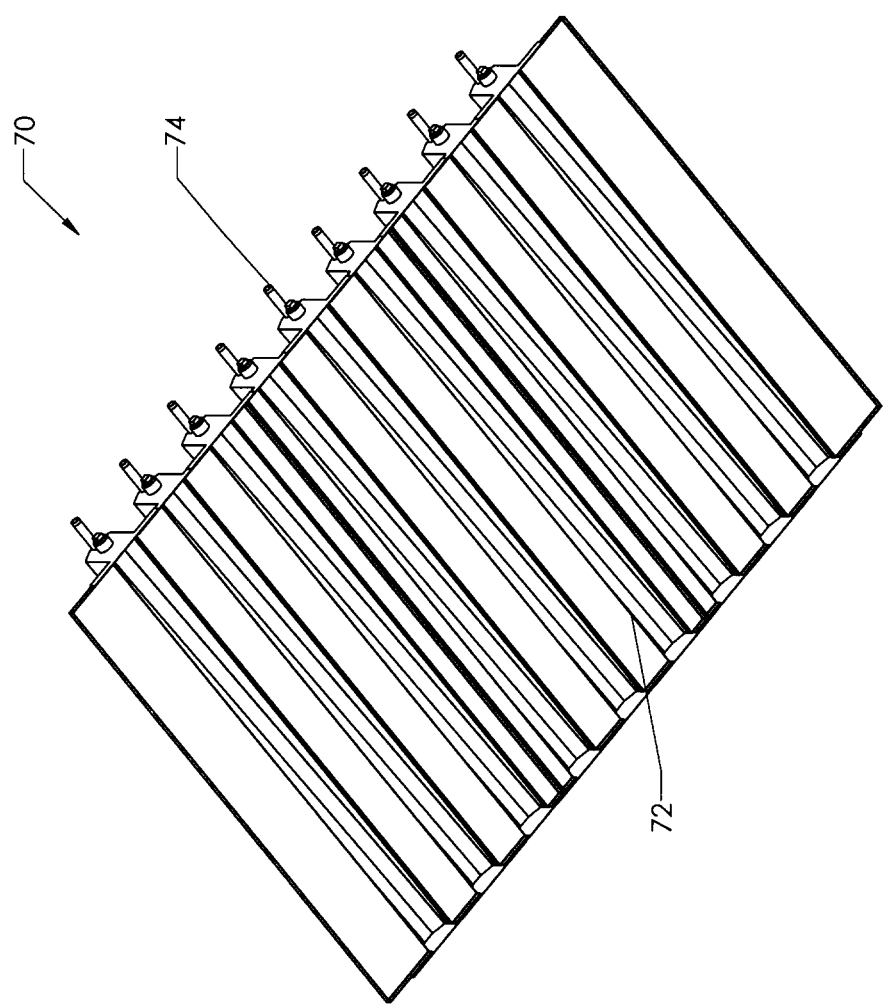
FIG. 6A is a top perspective view of an effluent collection and evacuation system as used in the apparatus shown in FIG. 1.

As shown in FIG. 6 the apparatus 10 comprises an effluent collection and evacuation system 70 which is disposed in the cathode-panel 14. In FIG. 6A, it can be seen that the collection and evacuation system 70 comprises an effluent collection pan 72 and effluent evacuation pipes 74.

Figure 7:
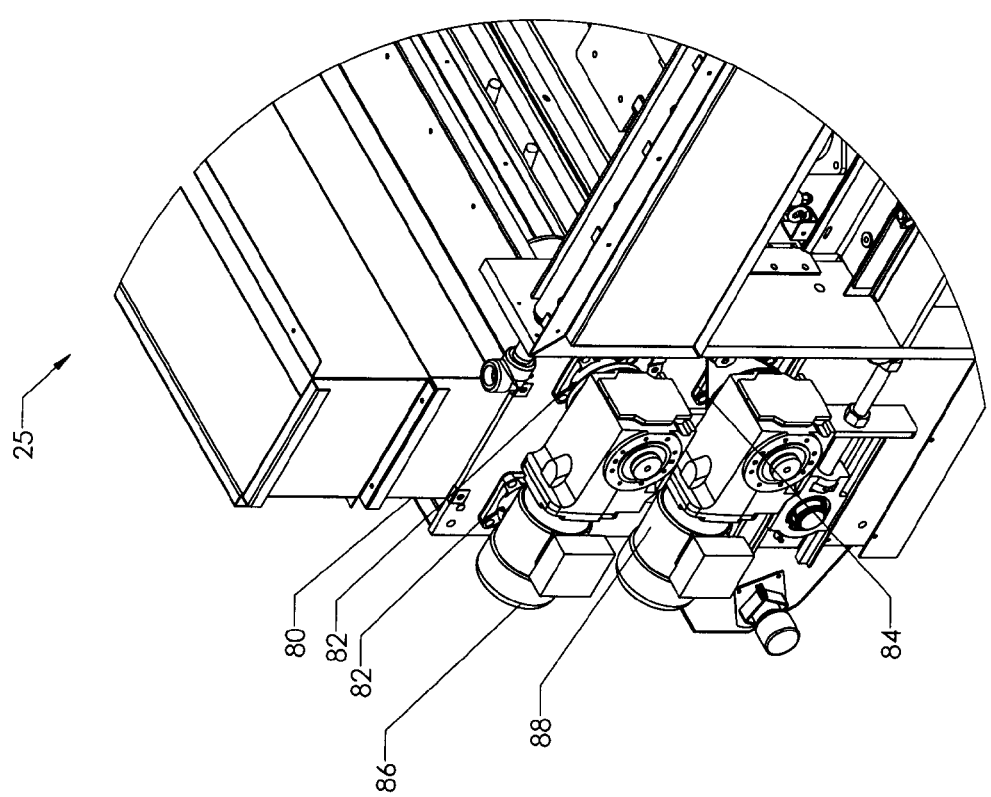
FIG. 7 is an enlarged view of a feeding system as used in the apparatus shown in FIG. 1.
Figure 7A:
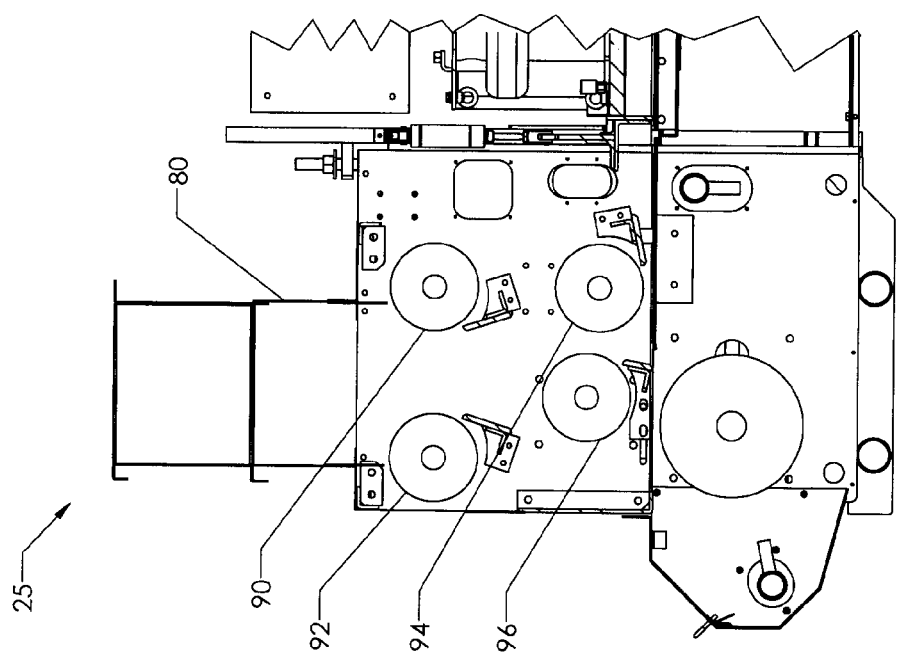
FIG. 7A is a cross-section view of the feeding system of FIG. 7.

As shown in FIG. 7 the feeding system 25 comprises a housing such as a hopper 80, upper flange bearings 82 which allow fixation of upper rollers 90 and 92 (see FIG. 7A). Lower flange bearings 84 are used for fixation of the lower rollers 94 and 96 (see FIG. 7A). A drive motor 86 is used for rotating the upper rollers 90 and 92 and a drive motor 88 is used for rotating the lower rollers 94 and 96.

Figure 8:
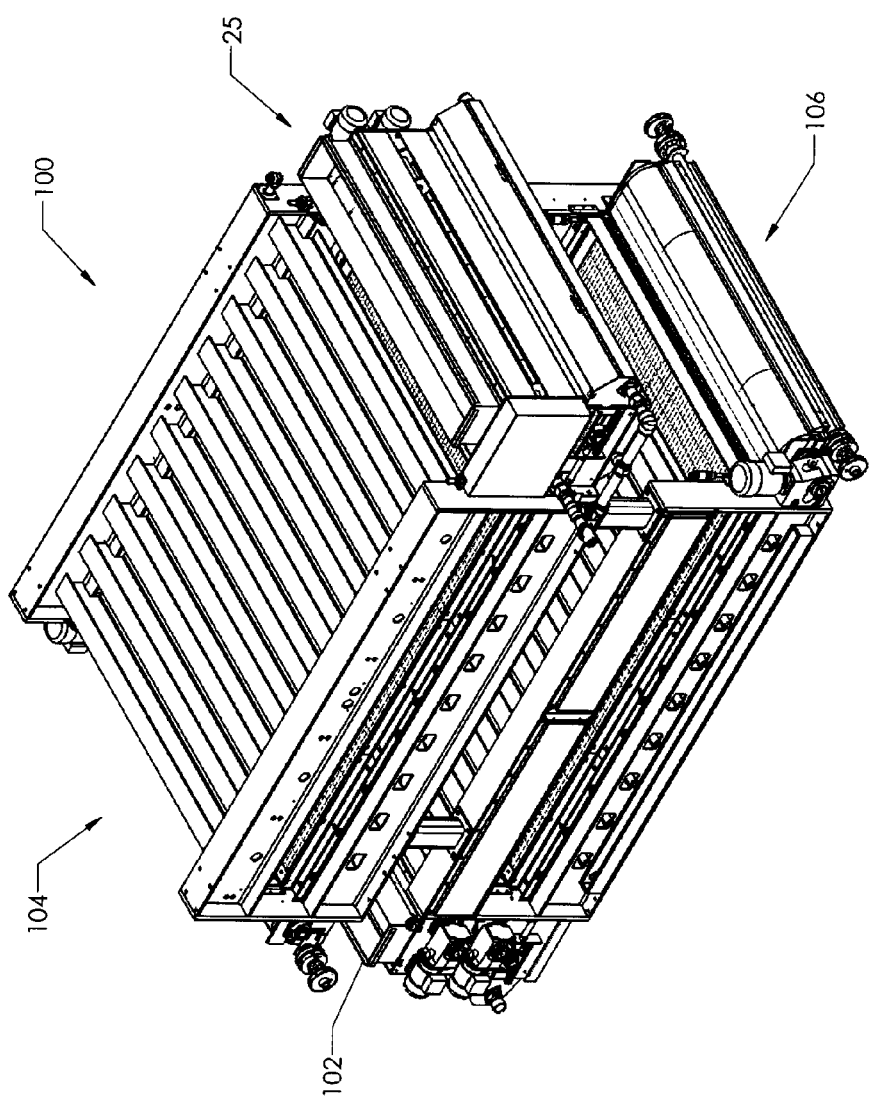
FIG. 8 is a side perspective view of an apparatus according to another specific example of the present invention, wherein the apparatus comprises two superposed modules disposed in series for the treatment and dewatering of a liquid bearing material, and wherein anode-units have been omitted for illustrative purposes.

As shown in FIG. 8, apparatus 100 comprises two superposed modules 104 and 106 which are disposed in series. A feeding system 25 is positioned at the inlet of the upper module 104 and a transfer and shredding system 102 permits to transfer the treated and dewatered liquid bearing material or substance to the lower module 106 for further treatment. Such a system can allow for shredding the treated substance so as to feed the module 106 for the next treatment.

Figure 9:
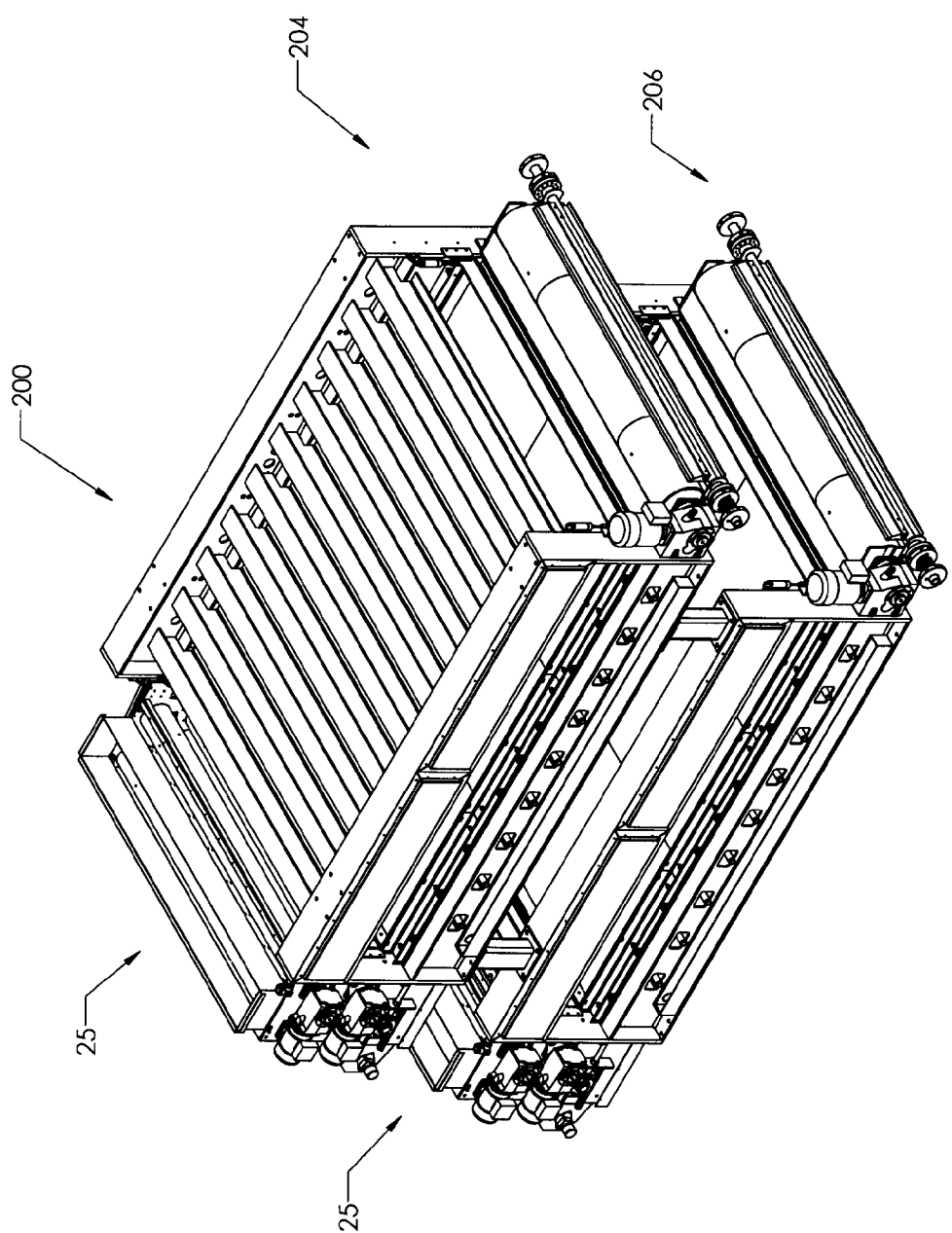
FIG. 9 is a side perspective view of an apparatus according to another specific example of the present invention, wherein the apparatus comprises two superposed modules disposed in parallel for the treatment and dewatering of a liquid bearing material, and wherein anode-units have been omitted for illustrative purposes.

As shown in FIG. 9, apparatus 200 comprises two superposed modules 204 and 206 which are disposed in parallel feeding systems 25 are positioned at the inlet of the modules 204 and 206.

The apparatus for treatment and dewatering of a liquid bearing material can comprise one or many modules. A module is a unit having a specific treatment capacity. The number of modules vary accordingly to the desired treatment capacity. The operating conditions of each module can be controlled independently. The modules can be stacked on one another. They can work in parallel or in series (cascade mode). In the first situation, each module gets its own feeding system (see FIG. 9). In the second situation (see FIG. 8, only the first module is supplied by a feeding system, the second module is supplied by a transfer and shredding system. The substance treated by this first module is afterward transferred to a second module and so on. The substance is treated and dewatered as it progresses through different modules.

As shown in FIGS. 1, 5 and 6, a module can comprise an upper panel 12 (anode-panel) and a lower panel 14 (cathode-panel). The anode-panel comprises: the anode-units 32, the longitudinal beams 16, the transversal beams 18, cooling system of power supplies, gas recuperation system and supporting metal structure. The anode-units 32 are laid transversally and longitudinally in the anode-panel. The cathode-panel 14 contains the perforated cathode 19, the conveyor 13 the longitudinal beams 20, effluent collection and evacuation system 70, vacuum system (not shown), cleaning and washing systems (not shown) for the conveyor, side panels for watertightness, drive motor for the fabric conveyor and supporting metal structure. The conveyor 13 can be made of a fabric laid over the stainless steel cathode 19. The cathode 19 can be supported by a metal structure capable of supporting the pressure applied on the substance to be treated. A cleaning and washing system can be installed on the cathode-panel 14 and can be useful for cleaning and removing treated substance sticking to the fabric conveyor. The power supplies can be disposed on the anode-panel 12 or in the proximity of the module, or included in each anode-unit 32. The power supplies are provided with a control system to prevent electrical short circuit.

The anode-unit 32 can comprise an immovable upper portion and a mobile lower portion. The immovable upper portion comprises guiding brackets 52 which are fixed on the metal plate 58 and side on the transversal beams 18 to fix the anode-unit 32 on the supporting metal structure. The immovable upper portion can also comprise two guiding cylinder 60 fixed to the metal plate 58 and the pneumatic actuators 50 (see FIG. 5). The mobile lower portion can comprise an electrical insulating and rigidifying plate 56, an inert, stable and non consumable electrode 54 and an attachment systems for the pneumatic actuators 50 through guiding cylinders 62. The springs 64 are fixed on the metal plate 58 and the insulating plate 56 and allows the return of the mobile lower portion at it's initial position (or to urge it into a raised position). The electrical connectors 66 are fixed on the anode 53. The mobile lower portion of the anode-unit 32 is attached to the immovable upper portion by the pneumatic actuators 50 and the springs 64. The inert, stable and non consumable electrode can comprise a valve metal substrate coated with metal oxide. The metal oxide can be, for example, chosen from $TiO_2$, $Ta_2O_5$, $TaO_2$, $RuO_2$, $IrO_2$, $SnO_2$, $Sb_2O_3$, and mixtures thereof. Titanium can be used as a valve metal substrate. For example the electrode used can be a titanium substrate coated with mixed iridium and tantalum oxides. Stainless steel can also be used as metal substrate. The electrode can comprise titanium that has been treated at a certain temperature that permits to obtain substoichiometric titanium oxide which is conductive. Such a titanium oxide can be called Magneli phase substoichiometric titanium oxide and is represented by formula $TinO_{2n-1}$ wherein n is from 4 to 10.

Each anode-unit 32 can be of parallelepiped shape. Each anode-unit can have its own power supply. The voltage, electrical current and pressure required for the treatment on a given anode-unit can be specific and independent. The pneumatic actuators 50 allows to develop the required pressure for the treatment on a given anode-unit. Each anode-unit can have its own power supply able to develop the electrical power required for the treatment on a given anode-unit. The mobile lower part of the anode-unit 32 is effective to follow the substance deformation during treatment, therefore maintaining a substantially constant contact between anode and treated substance. Anode-units are independent of one another and can be positioned at different levels.

As shown in FIGS. 1 to 7A, the feeding system 25 spreads the substance to be treated and dewatered, in the form of a cake of a given thickness, onto the conveyor 13. The feeding system permits to spread the substance on the conveyor substantially uniformly. In addition to the fact that such a feeding system permit a uniform deposition of the substance at a substantially defined thickness on the conveyor 13, it should also be noted that the feeding system permits a pre-compaction of the substance to be treated. Therefore, even before being compressed by means of the movable electrode (anode 53), the substance is pre-compacted by means of the feeding system 25. For example, such a compression and uniform deposition of the substance can permit to carry out a uniform electro-dewatering treatment on the substance. The conveyor 13 moves the substance to be treated under at least one row composed of transversally laid anode-units 32. A given pressure is applied to this substance by the action of the pneumatic actuators 50. Voltage is applied between anode-units and cathode 19 for a predetermined period of time so as to treat and dewater the substance. Decompression of the pneumatic actuators 50 and compression of the springs 64 permit to raise the mobile lower portion of the anode-units. The movement of the conveyor 13 will displace the semi treated substance to the next anode-units row where it will be further treated with specific voltage, current and pressure; while feeding the first anode-units row with untreated substance. This goes on until the end of the treatment cycle.

The treated and dewatered substance is then discarded and shredded by a system positioned at the outlet 17 of apparatus 10. Effluents are recuperated underneath the perforated cathode 19 by means of the effluent collection and evacuation system 70. Produced gas are recuperated at the upper section of apparatus 10. A vacuum system (not shown) is optionally installed underneath the cathode 19. This system allows better removal of effluent left in the conveyor 13 and cathode 19. The conveyor 13 is continuously cleaned at the outlet 17 and washed at the inlet 15.

When at least two operating modules are used and disposed in series (see modules 104 and 106 in FIG. 8) the transfer system 102, which comprises a shredding system, permits to transfer shredded and treated substance from a module to another one.

The feeding system 25 permits a uniform spreading of the substance to be treated at a defined thickness substantially on the entire width of the fabric conveyor 13.

In the upper section of the feeding system 25, distributor means (not shown) can spread the substance substantially over the entire length of the hopper 80. This distributor means can be for example a screw or an oscillating system. The level of substance can be equalized as the matter is distributed substantially over the entire length of the hopper 80. The thickness of the substance uniformly deposited onto the conveyor of the apparatus 10 is regulated by adjusting vertically the distance between the conveyor and the lower roller 94. According to the nature of the substance to be treated, a further adjustment can be done by changing the distance between rollers 94 and 96.

The distance between the upper rollers is larger than that between the lower rollers. The upper and lower rollers have a double function: they drive the substance and also allow to compress it. The external surface of the rollers can have a certain roughness so as to permit a better feeding of the substance. Such surface finish reduces the slip between substance and the rollers. The drive of substance depends on the surface contact with the rollers. Speeds of upper and lower rollers are selected according to the nature and the dryness of the substance. The speed of the conveyor of the apparatus 10 is also selected according to the quantity of substance required to be spread or deposited by the feeding system.

When the substance is poured and equalized over the entire length of the hopper 80. The upper rollers 90 and 92 will compact and move the substance vertically towards the lower rollers 94 and 96. Such lower rollers will provide further compression of the substance and will move it towards the conveyor of the apparatus 10. The distance between roller 94 and conveyor will permit to compress the substance and define the final thickness of the latter. The feeding system can operate continuously or as a batch process. It can also be automated by providing level sensors and drives.

When a given voltage is applied between two electrodes, voltage loss is noted. This loss is induced by a rising of the electrical resistance of the treated substance. This rise can be in part due to the formation, in the treated substance, of an electrically insulating crust at the anode interface and to the lowering of the water content of the treated substance in the vicinity of the anode. The voltage loss implies energy loss and reduction in treatment quality. To deal with this problem and to enhance voltage transfer from anode to the treated substance, two solutions can be used. Firstly, an electrolyte can be added at the anode-substance interface. This improves conductivity in the vicinity of the anode and also helps to stabilize voltage loss and maintain it to a reduced level during the treatment. Secondly, it is also possible to break the crust by mechanical means. These two solutions can also both be used.

The following examples represent in a non-limitative manner, various embodiments.

EXAMPLES

Sludge from Pulp and Paper Industry

Secondary sludge and mixed sludge containing both primary and secondary sludge have been tested.

These tests have been performed with an apparatus, as shown in FIG. 1. The apparatus contained 5 anode-units.

This feeding system dispenses and spreads uniformly the sludge to be treated and dewatered, on the form of a cake of a given thickness, substantially on the entire width of the filtering fabric conveyor. Then, treatment and electro-dewatering process is started.

The conveyor moves the sludge to be treated under the first anode-unit. A given pressure is applied on this sludge by the action of the pneumatic actuators. Voltage is applied between the first anode-unit and cathode for a predetermined period of time in order to treat and dewater the sludge. Decompression of the pneumatic actuators and compression of the springs raise the mobile lower portion of the first anode-unit. The movement of the conveyor displaces the semi-treated sludge to the second anode-unit where it will be further treated with specific voltage, current and pressure; while feeding the first anode-unit with untreated sludge. This goes on until the end of the treatment cycle.

Example 1

Pulp and Paper Industry Secondary Sludge

In this example, the time required for the treatment of each batch (anode-unit) was about 130 seconds. The total treatment process took about 11.5 minutes. The time required for the lifting of the anode-units is included in the processing time. The voltage used during the treatment was 60 volts.

The dryness of non-treated sludge was about 12% while the resulting electro-dewatered sludge had a dryness of about 44%.

Tables 1 and 2 show monitoring results and various parameters obtained in example 1 for each of the five anode-units.

TABLE 1

Parameters used for the first, second and third anode-unit.

| Anode-unit 1 | | | Anode-unit 2 | | | Anode-unit 3 | | |
|---|---|---|---|---|---|---|---|---|
| Time (s) | Pressure (PSI) | Current density (mA/cm$^2$) | Time (s) | Pressure (PSI) | Current density (mA/cm$^2$) | Time (s) | Pressure (PSI) | Current density (mA/cm$^2$) |
| 0 | 7 | 35.0 | 140 | — | — | 280 | — | — |
| 10 | 7 | 36.0 | 150 | 25 | 41.5 | 290 | 34 | 48.0 |
| 20 | 7 | 36.5 | 160 | 25 | 41.5 | 300 | 34 | 44.0 |
| 30 | 7 | 36.5 | 170 | 25 | 42.0 | 310 | 34 | 42.5 |
| 40 | 7 | 37.0 | 180 | 25 | 42.0 | 320 | 34 | 41.5 |
| 50 | 7 | 37.0 | 190 | 25 | 42.0 | 330 | 34 | 40.5 |
| 60 | 7 | 37.5 | 200 | 25 | 42.0 | 340 | 34 | 39.5 |
| 70 | 7 | 37.5 | 210 | 25 | 42.0 | 350 | 34 | 39.0 |
| 80 | 7 | 38.0 | 220 | 25 | 41.5 | 360 | 34 | 38.5 |
| 90 | 7 | 38.0 | 230 | 25 | 41.5 | 370 | 34 | 38.0 |
| 100 | 7 | 38.0 | 240 | 25 | 41.0 | 380 | 34 | 37.0 |
| 110 | 7 | 38.5 | 250 | 25 | 40.0 | 390 | 34 | 36.5 |
| 120 | 7 | 39.0 | 260 | 25 | 39.0 | 400 | 34 | 36.0 |
| 130 | 7 | 39.0 | 270 | 25 | 38.5 | 410 | 34 | 35.5 |

TABLE 2

Parameters used for the forth, and fifth anode-unit

| Anode-unit 4 | | | Anode-unit 5 | | |
|---|---|---|---|---|---|
| Time (s) | Pressure (PSI) | Current density (mA/cm$^2$) | Time (s) | Pressure (PSI) | Current density (mA/cm$^2$) |
| 420 | — | — | 560 | — | — |
| 430 | 46 | 39.0 | 570 | 54 | 40.0 |
| 440 | 46 | 36.5 | 580 | 54 | 36.0 |
| 450 | 46 | 36.0 | 590 | 54 | 31.5 |
| 460 | 46 | 34.5 | 600 | 54 | 28.5 |
| 470 | 46 | 34.0 | 610 | 54 | 26.0 |
| 480 | 46 | 33.0 | 620 | 54 | 23.0 |
| 490 | 46 | 32.0 | 630 | 54 | 21.5 |
| 500 | 46 | 31.0 | 640 | 54 | 20.0 |
| 510 | 46 | 30.0 | 650 | 54 | 18.0 |
| 520 | 46 | 29.0 | 660 | 54 | 15.5 |
| 530 | 46 | 28.5 | 670 | 54 | 14.0 |
| 540 | 46 | 27.5 | 680 | 54 | 13.0 |
| 550 | 46 | 26.0 | 690 | 54 | 12.5 |

Example 2

In the example 2, a mixed pulp and paper sludge (about 50% primary and 50% secondary sludge) was used. The dryness of non-treated sludge was about 15% while the electro-dewatered sludge has a dryness of about 42% dryness.

TABLE 3

Parameters used for the first, second and third anode-unit

| Anode-unit 1 | | | Anode-unit 2 | | | Anode-unit 3 | | |
|---|---|---|---|---|---|---|---|---|
| Time (s) | Pressure (PSI) | Current density (mA/cm$^2$) | Time (s) | Pressure (PSI) | Current density (mA/cm$^2$) | Time (s) | Pressure (PSI) | Current density (mA/cm$^2$) |
| 0 | 24 | 35.0 | 140 | — | — | 280 | — | — |
| 10 | 24 | 37.0 | 150 | 28 | 38.5 | 290 | 60 | 37.0 |
| 20 | 24 | 37.5 | 160 | 28 | 36.5 | 300 | 60 | 36.5 |
| 30 | 24 | 38.0 | 170 | 28 | 36.0 | 310 | 60 | 38.0 |
| 40 | 24 | 38.5 | 180 | 28 | 36.0 | 320 | 60 | 38.5 |
| 50 | 24 | 37.5 | 190 | 28 | 36.0 | 330 | 60 | 38.0 |
| 60 | 24 | 37.5 | 200 | 28 | 36.0 | 340 | 60 | 37.5 |
| 70 | 24 | 37.0 | 210 | 28 | 36.5 | 350 | 60 | 36.0 |
| 80 | 24 | 37.0 | 220 | 28 | 37.0 | 360 | 60 | 35.0 |
| 90 | 24 | 36.5 | 230 | 28 | 37.0 | 370 | 60 | 34.0 |
| 100 | 24 | 36.0 | 240 | 28 | 37.5 | 380 | 60 | 33.0 |
| 110 | 24 | 36.0 | 250 | 28 | 37.5 | 390 | 60 | 33.0 |
| 120 | 24 | 35.5 | 260 | 28 | 38.0 | 400 | 60 | 32.0 |
| 130 | 24 | 35.0 | 270 | 28 | 38.5 | 410 | 60 | 31.0 |

TABLE 4

Parameters used for the forth, and fifth anode-unit

| Anode-unit 4 | | | Anode-unit 5 | | |
|---|---|---|---|---|---|
| Time (s) | Pressure (PSI) | Current density (mA/cm$^2$) | Time (s) | Pressure (PSI) | Current density (mA/cm$^2$) |
| 420 | — | — | 560 | — | — |
| 430 | 57 | 15.0 | 570 | 58 | 29.0 |
| 440 | 57 | 28.5 | 580 | 58 | 27.5 |
| 450 | 57 | 25.0 | 590 | 58 | 26.0 |
| 460 | 57 | 24.0 | 600 | 58 | 24.5 |
| 470 | 57 | 23.5 | 610 | 58 | 23.5 |
| 480 | 57 | 23.5 | 620 | 58 | 23.0 |
| 490 | 57 | 23.0 | 630 | 58 | 22.5 |
| 500 | 57 | 22.5 | 640 | 58 | 21.5 |
| 510 | 57 | 22.5 | 650 | 58 | 21.5 |
| 520 | 57 | 22.5 | 660 | 58 | 21.0 |
| 530 | 57 | 22.5 | 670 | 58 | 20.5 |
| 540 | 57 | 22.0 | 680 | 58 | 19.5 |
| 550 | 57 | 22.0 | 690 | 58 | 19.0 |

Example 3

Municipal Secondary Sludge

In this example, municipal secondary sludge was treated. Same apparatus as in the precedent examples was used. The time required for the treatment of each batch (anode-unit) was about 180 seconds. The total treatment process took about 15 minutes. The time required for the lifting of the anode-units is included in the processing time. The voltage used during the treatment was 60 volts.

During the sludge treatment, three sampling were performed. For each sampling, untreated sludge, treated sludge and generated effluent were sampled for salmonella and fecal coliforms analyses.

Tables 5 and 6 show monitoring results and various parameters obtained during the treatment of the sludge sampled at the first sampling, and for each of the five anode-units.

Table 7 to 9 show micro-organisms reduction for the samples taken during the first, second and third sampling.

First Sampling

TABLE 5

Parameters used for the first, second and third anode-unit

| Anode-unit 1 | | | Anode-unit 2 | | | Anode-unit 3 | | |
|---|---|---|---|---|---|---|---|---|
| Time (s) | Pressure (PSI) | Current density (mA/cm$^2$) | Time (s) | Pressure (PSI) | Current density (mA/cm$^2$) | Time (s) | Pressure (PSI) | Current density (mA/cm$^2$) |
| 0 | 15.3 | 32.5 | 190 | 10.0 | 40 | 370 | 10.0 | 17.5 |
| 10 | 15.0 | 33 | 200 | 10.0 | 40 | 380 | 10.5 | 16 |
| 20 | 15.1 | 33.5 | 210 | 10.3 | 37 | 390 | 10.5 | 14.5 |
| 30 | 15.1 | 34.5 | 220 | 10.3 | 34.5 | 400 | 10.4 | 13.5 |
| 40 | 15.1 | 35 | 230 | 10.3 | 32.5 | 410 | 10.5 | 13 |
| 50 | 15.1 | 35.5 | 240 | 10.3 | 31 | 420 | 10.4 | 12.5 |
| 60 | 15.1 | 36 | 250 | 10.3 | 28.5 | 430 | 10.4 | 12.5 |
| 70 | 15.0 | 37 | 260 | 10.2 | 27 | 440 | 10.4 | 12 |
| 80 | 15.1 | 38.5 | 270 | 10.2 | 25.5 | 450 | 10.3 | 11.5 |

TABLE 5-continued

Parameters used for the first, second and third anode-unit

| Anode-unit 1 | | | Anode-unit 2 | | | Anode-unit 3 | | |
|---|---|---|---|---|---|---|---|---|
| Time (s) | Pressure (PSI) | Current density (mA/cm²) | Time (s) | Pressure (PSI) | Current density (mA/cm²) | Time (s) | Pressure (PSI) | Current density (mA/cm²) |
| 90 | 15.1 | 39 | 280 | 10.2 | 23.5 | 460 | 10.3 | 11.5 |
| 100 | 15.0 | 40 | 290 | 10.2 | 21.5 | 470 | 10.3 | 11.5 |
| 110 | 15.0 | 40 | 300 | 10.2 | 21 | 480 | 10.3 | 11 |
| 120 | 15.1 | 40 | 310 | 10.2 | 20.5 | 490 | 10.3 | 11 |
| 130 | 15.1 | 40 | 320 | 10.1 | 19.5 | 500 | 10.2 | 10.5 |
| 140 | 14.8 | 40 | 330 | 10.0 | 18.5 | 510 | 10.1 | 10.5 |
| 150 | 14.8 | 40 | 340 | 10.0 | 17.5 | 520 | 10.1 | 10.5 |
| 160 | 14.8 | 40 | 350 | 10.0 | 17.0 | 530 | 10.1 | 10.5 |
| 170 | 14.8 | 40 | 360 | 10.0 | 17.0 | 540 | 10.0 | 10.5 |
| 180 | 14.8 | 40 | — | — | — | — | — | — |

TABLE 6

Parameters used for the forth, and fifth anode-unit

| Anode-unit 4 | | | Anode-unit 5 | | |
|---|---|---|---|---|---|
| Time (s) | Pressure (PSI) | Current density (mA/cm²) | Time (s) | Pressure (PSI) | Current density (mA/cm²) |
| 550 | 9.2 | 26.7 | 730 | 10.6 | 12.5 |
| 560 | 9.2 | 20.0 | 740 | 10.4 | 14.0 |
| 570 | 9.3 | 13.5 | 750 | 10.3 | 12.5 |
| 580 | 9.2 | 11.5 | 760 | 10.2 | 10.5 |
| 590 | 9.9 | 10.5 | 770 | 10.2 | 9.5 |
| 600 | 9.8 | 10.0 | 780 | 13.1 | 9.0 |
| 610 | 9.7 | 9.5 | 790 | 13.0 | 9.5 |
| 620 | 9.7 | 10.0 | 800 | 13.0 | 9.0 |
| 630 | 9.5 | 9.5 | 810 | 13.0 | 8.5 |
| 640 | 9.5 | 9.0 | 820 | 13.0 | 8.0 |
| 650 | 9.5 | 9.0 | 830 | 12.9 | 8.0 |
| 660 | 9.5 | 8.5 | 840 | 12.9 | 7.5 |
| 670 | 9.3 | 8.5 | 850 | 12.8 | 7.5 |
| 680 | 9.2 | 8.5 | 860 | 12.8 | 7.2 |
| 690 | 9.1 | 8.0 | 870 | 12.7 | 7.0 |
| 700 | 9.2 | 8.5 | 880 | 12.7 | 7.0 |
| 710 | 9.7 | 8.0 | 890 | 12.6 | 7.0 |
| 720 | 9.8 | 8.5 | 900 | 12.7 | 7.0 |

TABLE 7

Microorganisms reduction

| Microorganisms | Untreated sludge | Treated sludge | Generated effluent |
|---|---|---|---|
| *Fecal coliforms* | >10000 MPN/g dry weight | <9 MPN/g dry weight | <10 CFU/100 ml |
| *Salmonella* spp. | <3 MPN/4 g dry weight | <3 MPN/4 g dry weight | <2 MPN/100 ml |

Second Sampling

TABLE 8

Microorganisms reduction

| Microorganisms | Untreated sludge | Treated sludge | Generated effluent |
|---|---|---|---|
| *Fecal coliforms* | >11000 MPN/g dry weight | 10 MPN/g dry weight | <10 CFU/100 ml |

TABLE 8-continued

Microorganisms reduction

| Microorganisms | Untreated sludge | Treated sludge | Generated effluent |
|---|---|---|---|
| *Salmonella* spp. | 293 MPN/4 g dry weight | <3 MPN/4 g dry weight | <2 MPN/100 ml |

Third Sampling

TABLE 9

Microorganisms reduction

| Microorganisms | Untreated sludge | Treated sludge | Generated effluent |
|---|---|---|---|
| *Fecal coliforms* | >11000 MPN/g dry weight | <2 MPN/g dry weight | <10 CFU/100 ml |
| *Salmonella* spp. | 80 MPN/4 g dry weight | <3 MPN/4 g dry weight | <2 MPN/100 ml |

As it can be seen from Table 7 to 9, fecal coliforms and salmonella levels where reduced after the treatment. It can also be seen that, levels of coliforms and salmonella in the generated effluent are below detection limits.

It was shown that the apparatuses and processes of the present invention permit to efficiently dewater a substance such as a sludge and to obtain a high dryness. Moreover, the apparatuses and processes allow the dewatering of substances composed with fine particles. It was also shown that such apparatuses and processes were effective for microorganisms deactivation and/or destruction.

The apparatuses and processes allow to control the parameters of treatment for each anode-unit (voltage, current and pressure) during the treatment as well as the thickness of the substance to be treated and dewatered. Such a control makes it possible to obtain a good quality of treatment and also to control the power consumption.

The apparatuses and processes are flexible and able to treat different substances with variable dryness. Moreover, the apparatuses and processes allow having a high capture rate thus, the effluents present a low quantity of totals solids in suspension (TSS)

The apparatuses and processes allow the evacuation of gas produced during the treatment of the substance.

The apparatuses have a simple mechanic and present automatic adjustments of the parameters according to the characteristics of the substance to be treated.

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth, and as follows in the scope of the appended claims.

What is claimed is:

1. An apparatus for increasing dryness of a substance, said apparatus comprising:
    a feeding system adapted to allow a uniform spreading of the substance at a defined thickness, wherein said feeding system comprises a housing comprising an inlet, an outlet, and a roller disposed in said housing and adjacent to said outlet, said roller being adapted to compress and move said substance substantially vertically towards said outlet, wherein said thickness is regulated by adjusting a vertical distance between the conveyor and the roller;
    at least one module, each of said module(s) comprising at least two electrodes adapted to submit said substance to an electric current;
    a conveyor for imparting a movement in a predetermined direction to said substance; and
    wherein one of said electrodes is part of or in contact with said conveyor; and another of said electrodes is adapted to move in a direction which is substantially perpendicular to said predetermined direction and to compress said substance.

2. The apparatus of claim 1 wherein at least one of said electrodes is adapted to provide an electrolyte to said substance for reducing and/or preventing voltage loss at said electrode.

3. The apparatus of claim 1, wherein said apparatus comprises at least two modules, said modules being disposed in series in order to treat said substance.

4. The apparatus of claim 1, wherein one of said electrodes is adapted for dispensing an electrolyte at an electrode-substance interface.

5. The apparatus of claim 1, further comprising at least one pneumatic actuator, at least one mechanical system, at least one piston, or at least one electrical system for moving said other electrode.

6. The apparatus of claim 1, wherein voltage, electrical current, and pressure are independently controlled for each module.

7. The apparatus of claim 1, wherein said apparatus comprises at least two modules disposed in series, said apparatus comprising, between adjacent modules, a transfer system, which comprises a shredding system, said system permitting to transfer shredded and treated substance from a module to another one.

8. The apparatus of claim 1, wherein the pressure applied to said substance varies according to the substance consistency.

9. The apparatus of claim 1, wherein said other electrode is an anode.

10. The apparatus of claim 9, wherein said anode is adapted to maintain a substantially constant contact with said substance during a treatment of the substance.

11. The apparatus of claim 9, wherein said anode is a perforated anode.

12. The apparatus of claim 9, wherein said apparatus further comprises a filter mounted on said anode and adapted to be disposed between the anode and a substance to be treated with said apparatus.

13. The apparatus of claim 1, wherein said apparatus comprises at least one module, and wherein said electrodes adapted to compress said substance are anodes which are disposed into an anode-panel so as to extend into rows transversally and into lines longitudinally.

14. The apparatus of claim 1, wherein each of said electrodes adapted to compress said substance is an anode and is disposed into an anode-unit, said anode-unit comprises a mobile lower portion and an upper portion which is adapted to be immovable with respect to said apparatus when said lower portion is in movement; wherein said upper portion comprises means for allowing fixation on a supporting structure, and said lower portion comprises said anode, said anode-unit comprises means for moving said anode.

15. The apparatus of claim 1, wherein said apparatus comprises a control system for preventing electrical short circuit.

16. The apparatus of claim 1, wherein said at least one electrode comprises a valve metal substrate coated with a metal oxide chosen from $TiO_2$, $Ta_2O_5$, $TaO_2$, $RuO_2$, $IrO_2$, $SnO_2$, $Sb_2O_3$, and mixtures thereof.

17. The apparatus of claim 1, wherein said housing further comprises at least two rollers disposed in said housing and adjacently to said outlet, said rollers being adapted to compress and move said substance substantially vertically towards said outlet, one of said rollers being closer to the outlet than at least one other of said rollers, said roller which is closer to the outlet is adapted to move essentially vertically so as to control the thickness of the substance to be dispensed through the outlet.

18. The apparatus of claim 17, wherein said rollers are substantially horizontally extending and are rotated around a substantially horizontal rotation axis, the rotation axis of said roller which is closer to the outlet is lower than the rotation axis of the at least one other roller, said rollers being adapted to receive therebetween the substance to be dispensed.

19. The apparatus of claim 17, wherein said rollers comprise apertures for evacuating a liquid.

20. The apparatus of claim 1, wherein at least one of said electrodes is comprised within at least one independent electrode-unit, when more than one electrode-units being present, said electrode-units being isolated from one another.

21. A sludge decontamination apparatus for decontaminating sludge, said apparatus comprising:
    a feeding system adapted to allow a uniform spreading of the sludge at a defined thickness, wherein said feeding system comprises a housing comprising an inlet, an outlet, and a roller disposed in said housing and adjacent to said outlet, said roller being adapted to compress and move said substance substantially vertically towards said outlet, wherein said thickness is regulated by adjusting a vertical distance between the conveyor and the roller;
    at least one module, each of said module(s) comprising at least two electrodes adapted to submit said sludge to an electric current;
    a conveyor for imparting a movement in a predetermined direction to said sludge; and
    wherein one of said electrodes is part of or in contact with said conveyor; and another of said electrodes is adapted to move in a direction which is substantially perpendicular to said predetermined direction and to compress said sludge.

22. An apparatus for electro-dewatering sludge comprising:
- a feeding system for spreading sludge at a uniform thickness, wherein said feeding system comprises a housing comprising an inlet, an outlet, and a roller disposed in said housing and adjacent to said outlet, said roller being adapted to compress and move said substance substantially vertically towards said outlet, wherein said thickness is regulated by adjusting a vertical distance between the conveyor and the roller;
- a conveyor for receiving the sludge from the feeding system and for advancing the sludge along the apparatus from an inlet to an outlet;
- a cathode downstream from the feeding system located under the conveyor and in contact with the conveyor;
- an anode located above the conveyor and the cathode, the anode being configured to establish direct contact with the sludge and for compression of the sludge while an electrical charge flows between the anode and the cathode;
- wherein the anode is configured to move in a direction that is perpendicular to a direction of movement of the conveyor and to alternate between applying the compression and the electrical charge to the sludge, and removing the compression and the electrical charge from the sludge.

* * * * *